Nov. 5, 1968  K. J. HEINICKE ET AL  3,408,951
ROLLER TYPE VEHICLE CONVEYOR
Filed Aug. 31, 1966  3 Sheets-Sheet 1
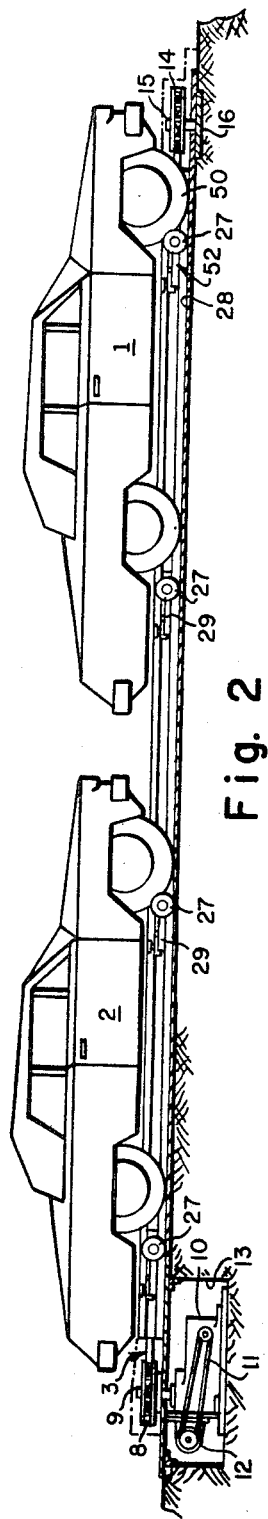
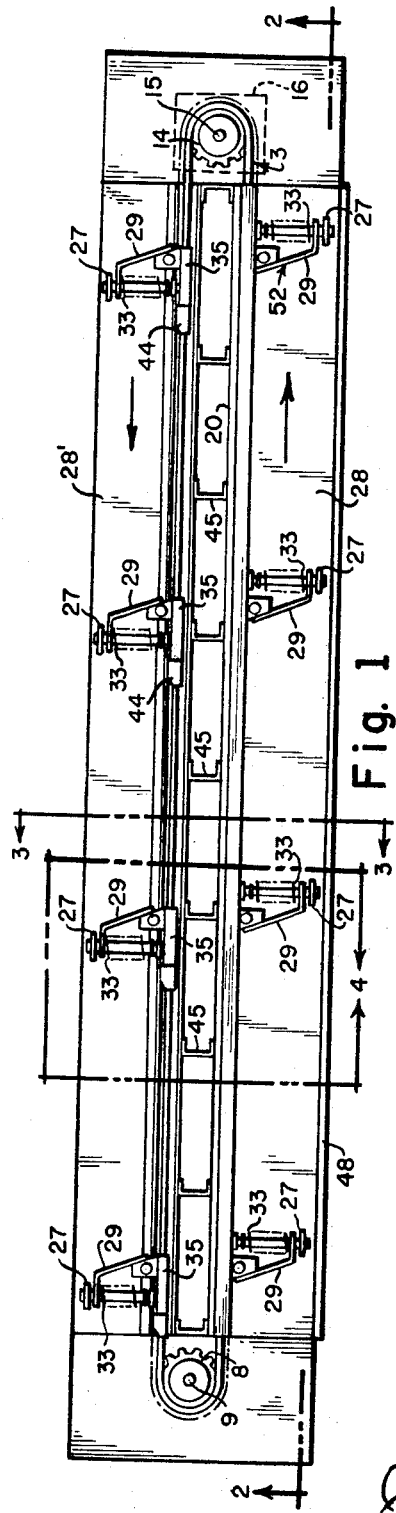
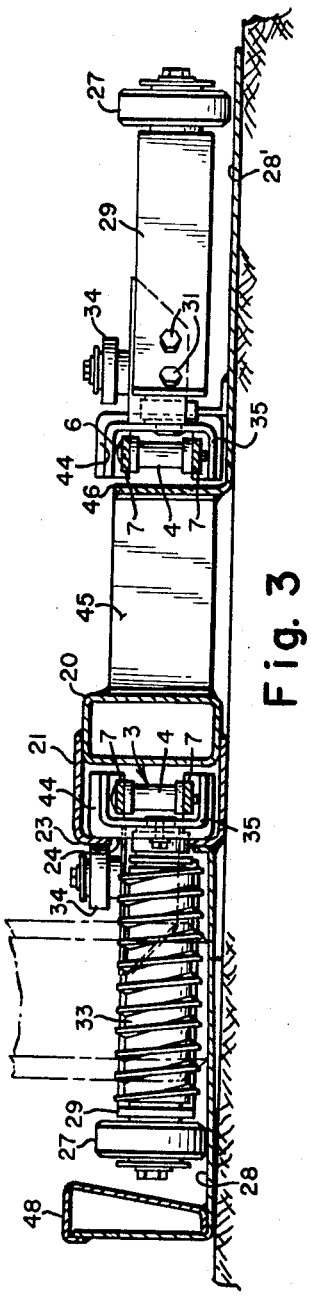
INVENTORS.
KURT J. HEINICKE
PAUL K. SHAFER
RICHARD B. BOWSER
James N. Cyles
ATTORNEY

INVENTORS.
KURT J. HEINICKE
PAUL K. SHAFER
RICHARD B. BOWSER

James Cyles
ATTORNEY

United States Patent Office 3,408,951
Patented Nov. 5, 1968

3,408,951
ROLLER TYPE VEHICLE CONVEYOR
Kurt J. Heinicke, Richard B. Bowser, and Paul K. Shafer, Hollywood, Fla.; said Bowser and said Shafer assignors to Heinicke Instruments Company, Hollywood, Fla., a corporation of Florida
Filed Aug. 31, 1966, Ser. No. 576,426
1 Claim. (Cl. 104—172)

ABSTRACT OF THE DISCLOSURE

An apparatus for moving a vehicle, such as an automobile, through a so-called "car wash," the apparatus comprising a driven endless chain having laterally projecting axles carrying wheels and rollers. The rollers have spiral peripheral surfaces for engagement with one wheel at a time of the car, and preferably one of the front wheels thereof, to thereby move the car. When the limit of movement of the car by the engagement with its front wheel is reached, a following roller engages the rear wheel of the car and moves the car beyond the distance of travel of the rollers so that the car then becomes disengaged from the conveying means.

---

This invention relates to propulsion means for motor vehicles with particular reference to means by which automobiles are moved by a suitable conveyor apparatus through a so-called "car wash" wherein they are washed, rinsed or otherwise treated and are then discharged from the conveying means.

It is an object of the invention to provide an apparatus of this kind which will effectively move one vehicle after another through a predetermined path of travel by pushing against the wheel of the vehicle, such as through a "car wash" structure, and at the end of the required travel of the car will automatically cause it to become separated from the conveying means and thereupon discharged from the wash rack.

More particularly the invention contemplates a provision of a conveyor consisting of chain sections disposed to one side of the longitudinal center line of the vehicle, being moved by it and between the wheels of the vehicle, and means for driving the chain at the required speed, the conveyor chain being driven by sprockets that are rotative on vertical axes, and the chain being provided with laterally projecting roller carriages which have rollers that successively contact with the wheels of the vehicle along one side of the car and cause it to move forwardly, with the roller units moving away from contact with the wheels of the car as soon as the wheels move beyond the distance of travel of the rollers, so that the car thereupon becomes discharged from the conveying means.

With these and other objects to be hereinafter set forth in view, we have devised the arrangement of parts to be described and more particularly pointed out in the claim appended hereto.

Figure 4:
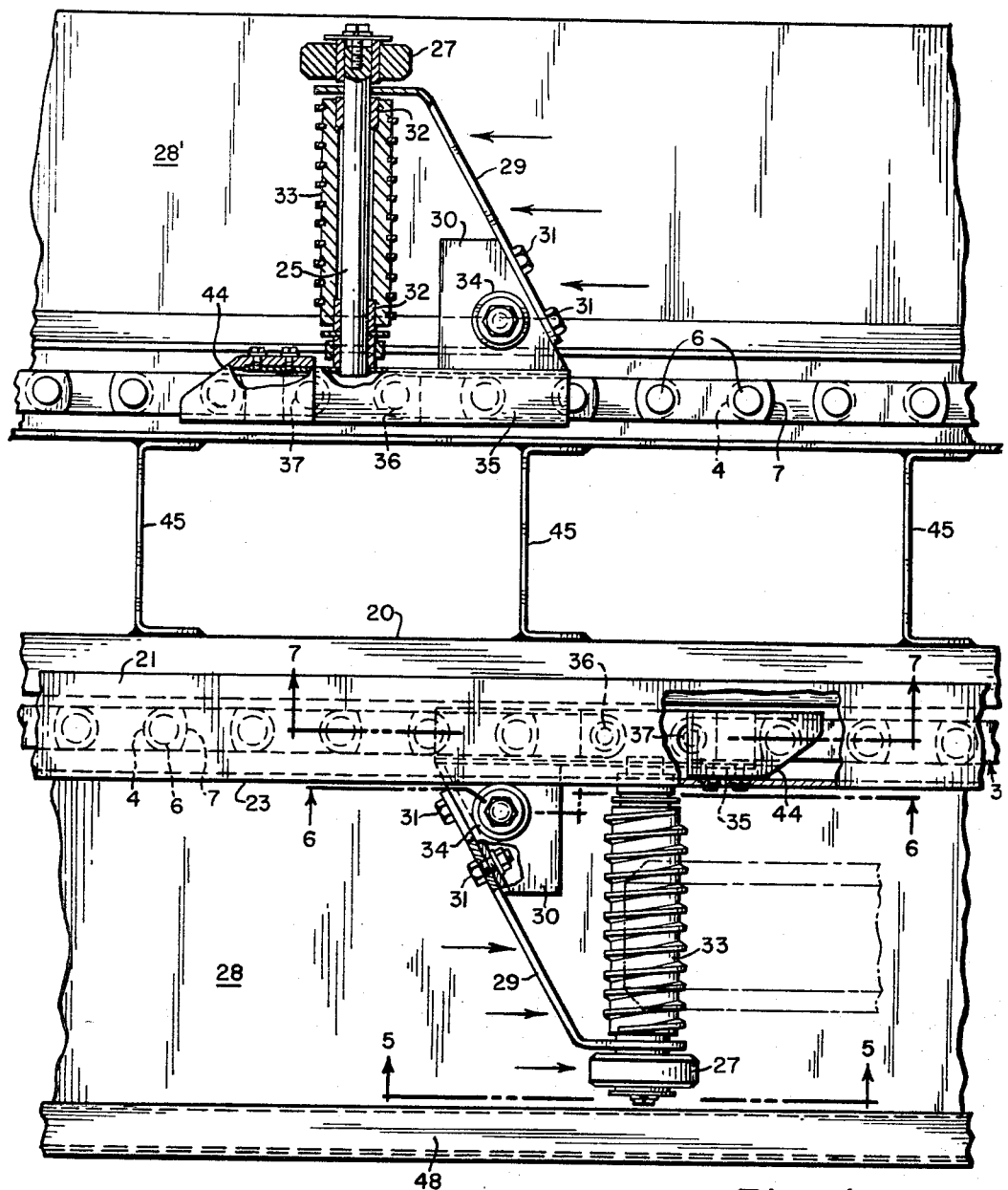
Figure 5:
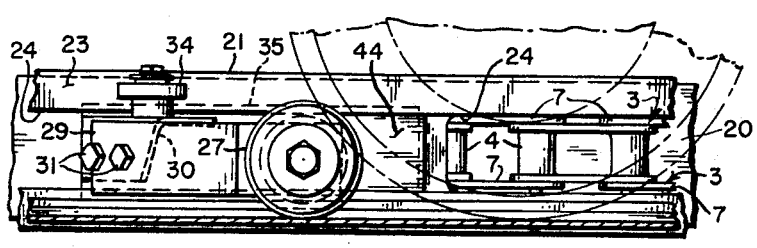
Figure 9:
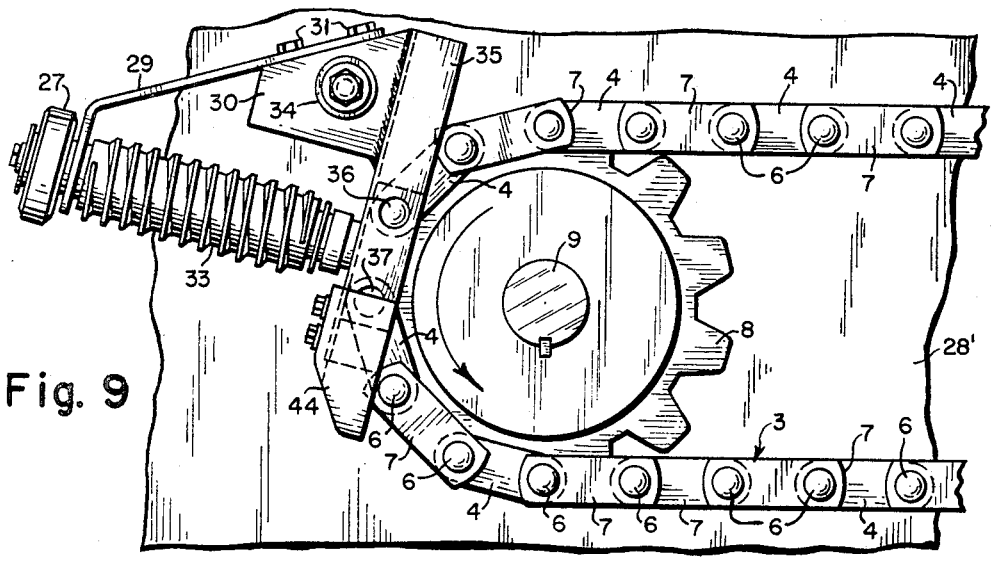
Figure 6:
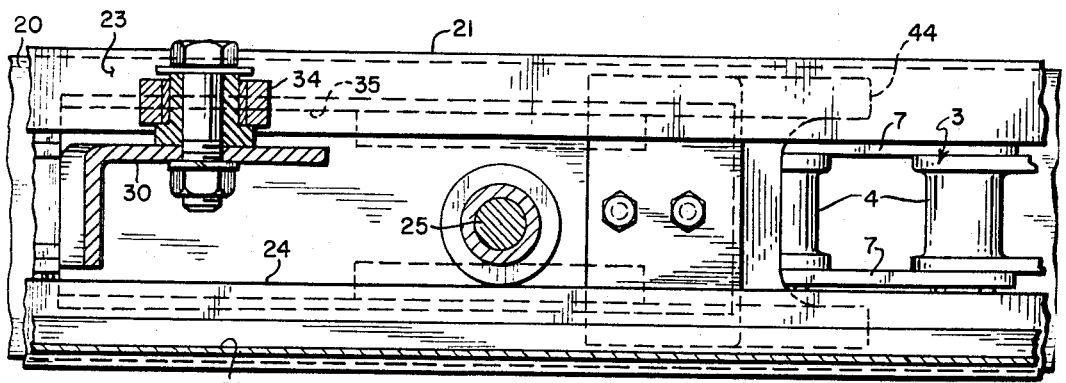
Figure 7:
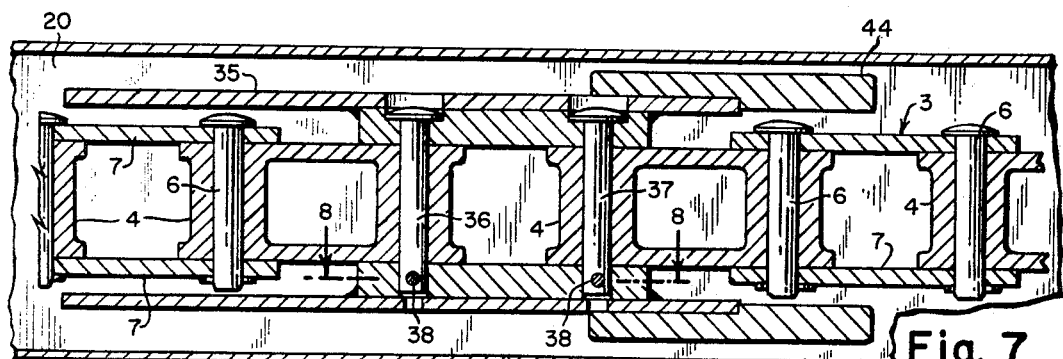
Figure 8:
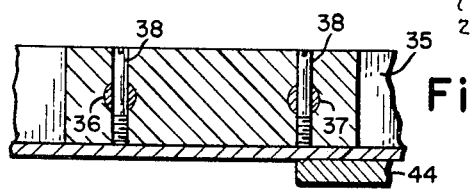

In the accompanying drawings, wherein an illustrative embodiments of the invention is disclosed:

FIGURE 1 is a plan view of a roller conveyor constructed in accordance with the invention, FIGURE 2 is a side elevational view thereof, FIGURE 3 is a transverse section taken through the conveyor, substantially on line 3—3 of FIGURE 1, FIGURE 4 is a view taken substantially on line 4—4 of FIGURE 1, parts being shown in section and parts in elevation, disclosing the means of contacting the rollers with the wheels of the vehicle, FIGURE 5 is a horizontal section taken substantially on line 5—5 of FIGURE 4, FIGURE 6 is a longitudinal section taken substantially on line 6—6 of FIGURE 4, FIGURE 7 is a longitudinal section taken substantially on line 7—7 of FIGURE 4, FIGURE 8 is a fragmentary section taken substantially on line 8—8 of FIGURE 7, and FIGURE 9 is a top plan view of a drive sprocket for driving the chain elements of the system.

The apparatus shown in the drawings is primarily intended for the movement of automobiles through a path at a relatively low rate of speed and when the cars do not proceed under their own power and while work or operations are being conducted on them, such as while they are being washed or cleaned in a so-called "car wash."

In FIGURE 1, there has been illustrated two vehicles, one behind the other and indicated respectively at 1 and 2 and which are being propelled through a washing rack by the apparatus of the present invention. Such an apparatus includes chain sections 3 which is of the known combination chain type, thus being constructed of bars 4 and 5, connected by pins 6 extending through links 7. At one end, the chain 3 extends around a sprocket 8, carried on a vertically disposed shaft 9, said shaft being the output shaft of a reducing gear arrangement of known character contained within the gear box, shown at 10 in FIGURE 2. Said gear box is driven by a variable speed belt or chain 11 from an electric motor 12. The motor, gear box and other associated parts are all contained in an underground chamber 13, shown particularly in FIGURE 2, with the sprocket and chain located above ground.

At its opposite end, the chain 3 engages a sprocket 14, provided on a vertical shaft 15, extending upwardly from a surface mounted anchor plate 16 that is disposed within a recess of the upper surface of the apparatus.

The roller units, as hereinafter explained, form carriages and have rollers which engage the wheels of the vehicle to be propelled, are pivotally attached at required intervals between sections of the chain and they project laterally therefrom. Each of these roller units or carriages includes a horizontally arranged axle, indicated at 25 and the axle carries a wheel 27 at its outer end, said wheel riding upon the track 28 of the conveyor. The outer end of the axle 25 is supported by a diagonal brace 29 and the brace is disposed upon the axle, between the roller and the wheel and the brace is angled rearwardly and coupled to a bracket 30, fixed to the carriage and the brace is connected to the bracket by bolts 31. Rotatively mounted upon bushings 32 is a roller 33 having a surface provided with a spiral rib that contacts the wheel of the vehicle and a smaller roller 34, rotative upon the bracket 30 has riding engagement on the sides of the flange 23 of the plate 21 and as clearly shown in FIGURE 3.

The axle 25 passes through the slot 24 and is attached at its inner end to a bracket in the form of a channel strip 35 that is attached between the chain section 3 by means of the pivot pins 36 and 37, shown in FIGURES 7 and 8, said pivot pins being held in place against displacement by retaining set screws 38, shown particularly in FIGURE 8. Pins 36 and 37 pass through a small forging and the chain sections 3 are connected to the links formed by the forging is with the roller sections 3 extending between the several carriages and the inner ends of the axle 25 and a wear casting 44 is interposed between the flanges 23 and the channel piece 35, as clearly shown in FIG. 3.

The base plate 28 upon the return passage of the conveyor, is angled upwardly and spaced from the tubular piece 20 and U-shaped spacers 45 are welded to one side of the tubular piece 20 and the upturned edge 46, holding the trackways in rigidly spaced apart relation. In the forward trackway, there has been provided an angled base plate 28, that terminates in a guard rail 48, providing a guide barrier for the automobile wheels and the angled base plate 28 is welded to one flange 23 so as to move toward the inside of the track.

From the foregoing, the operation of the apparatus will be readily understood. The chain sections 3 are located beneath the vehicles and to one side of the longitudinal center line thereof and with the roller carriages so projecting from the chain that they will successively engage the wheels of the car on one side thereof, such as one of the left hand wheels only. As each vehicle enters on the wash rack, or from the left, one of the roller carriages or that indicated at 52 is moved by the chain 3 to bring it behind the front right wheel 50 and the roller 33 on said carriage contacts with the tire on said wheel and edges the car forwardly or in the direction of the arrows in FIGURE 1. The car thus moves forwardly by the roller carriage 52 until front wheels of the car pass beyond the wash rack or reach the extreme right in FIGURES 1 and 2. The chain in its movement swings the roller carriage 52 away from the front wheels of the vehicle while such movement of the chain brings the next roller carriage or that shown at 53 up against the right rear wheels 51 of the car, propelling the car forwardly until it is completely clear of the chain and the roller carriages carried thereby and until the car is also off the rack.

The operation of the apparatus is thus a continuous one and one car after the other is thus propelled along the length of the rack, and is then discharged without imposing any pulling strain upon the cars or any parts thereof.

It will be understood that the spacing between the roller units or carriages is such that the car being propelled, for the greater part of the travel, moved along by the contact of only one of the roller units with the right front wheel of the car, and that the rear wheel thereof is only contacted by the following roller unit when the first roller unit is swung away from the front wheel. The threaded roller 33, while rotating against the automobile wheel will apply force to the wheel that prevents the wheel from deviating from the path of the conveyor track. The double pins 36 and 37 that couple the chain sections 3 with the channel member 35, control the movement of the roller carriages as they pass around the sprockets 8 and 14 and the wear guide 44 is the only friction contact with the track.

Having thus described an embodiment of the invention, it is obvious that the same is not to be restricted thereto, but is broad enough to cover all structures coming within the scope of the appended claim.

We claim:

1. An apparatus for moving a car comprising, a sprocket chain formed of chain sections, sprockets engaged by the chain, said sprockets having vertical axes, means for driving at least one of the sprockets, said means including a vertical shaft on which one of the sprockets is mounted, carriages connected between the chain sections and with each of the carriages having a laterally projecting, horizontally arranged axle, a wheel carried by the outer end of the axle for riding engagement with a trackway, the carriages and the rollers being spaced apart on the chain to permit one of them to engage a front wheel of a car and move the car forwardly for a predetermined distance and to then permit another one of the rollers to engage a rear wheel of the car and move the car when the front wheel of a car has passed beyond the limit of travel in one direction of the particular roller that was engaged behind one of the front wheels, each of the rollers being provided on its periphery with a spiral rib to assist in wheel alignment in the trackway, each carriage including a channel piece pivotally attached to the chain sections by a link and with the link pivotally connected to the channel piece by spaced apart pins, a guide in which the chain travels, a diagonal brace connected to the carriage and having one end disposed between an end of one of the rollers and the adjacent wheel, a roller carried by the brace, said roller rolling against a side of the chain guide, a sloped trackway connected to one side of the chain guide, which sloped trackway terminates in an upstanding rail, said rail limiting the travel of the wheels of the vehicle, the said sloped trackway causing the vehicle wheels to lead toward the high side of the slope.

References Cited

UNITED STATES PATENTS

| 1,831,367 | 11/1931 | Rosenthal | 74—214 |
| 3,058,433 | 10/1962 | Hurst | 104—172 |
| 3,196,806 | 7/1965 | Brunder | 104—172 |
| 3,233,557 | 2/1966 | Rickel | 104—172 |
| 1,095,445 | 5/1914 | Alvey | 193—37 |

ARTHUR L. LA POINT, *Primary Examiner.*

D. F. WORTH III, *Assistant Examiner.*